R. L. Hall,
Bed Bottom.

N° 58,545. Patented Oct. 2, 1866.

Witnesses.
J. M. Pevey
G. E. Pevey.

Inventor.
Robert L. Hall

UNITED STATES PATENT OFFICE.

ROBERT L. HALL, OF LOWELL, MASSACHUSETTS; ONE-HALF, UNDIVIDED, ASSIGNED TO JOS. G. RUSSELL; PATENT TO ISSUE TO HALL & RUSSELL, OF BOSTON, MASSACHUSETTS.

IMPROVED BED-BOTTOM.

Specification forming part of Letters Patent No. 58,545, dated October 2, 1866.

*To all whom it may concern:*

Be it known that I, ROBERT L. HALL, of Lowell, county of Middlesex, and State of Massachusetts, have invented new and useful Improvements in Spring Bed-Bottoms; and I do hereby declare that the following is a full and exact description thereof, reference being had to the accompanying drawings and letters of reference marked thereon.

The nature of my invention consists in providing for a bed-bottom slats with circular holes at each end for the reception of the rubber springs with metallic washers.

To enable others skilled in the art to make and use my invention, I will proceed to describe its construction and operation.

Figure 1:
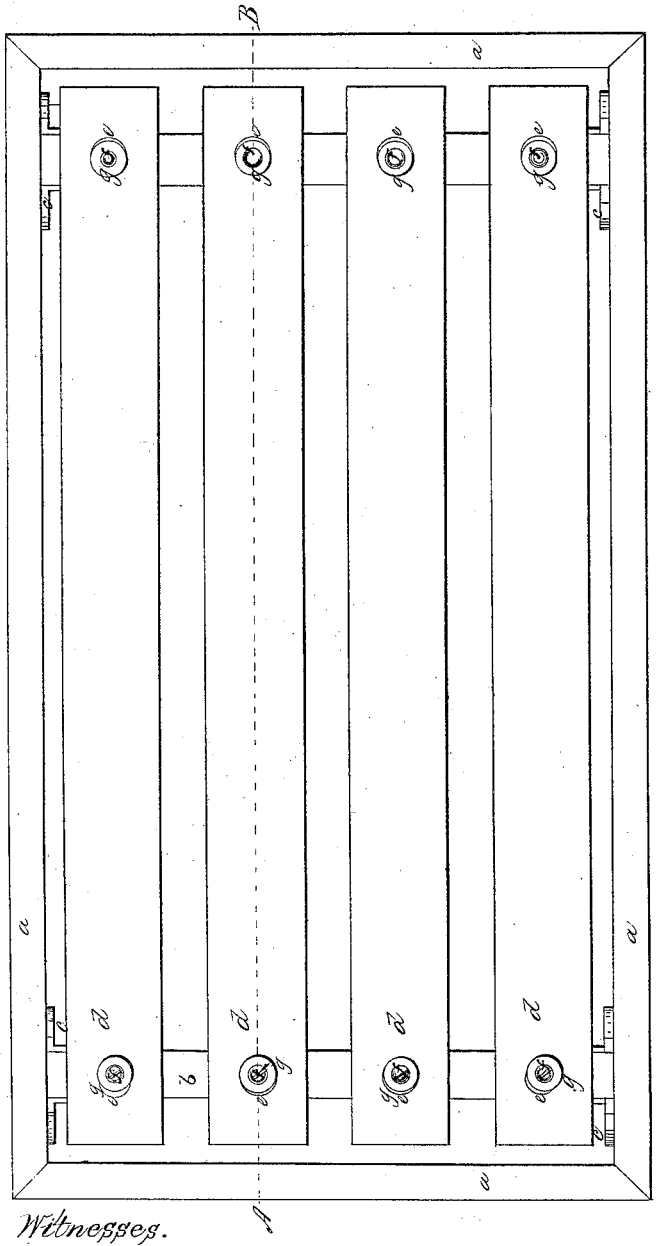
Figure 2:
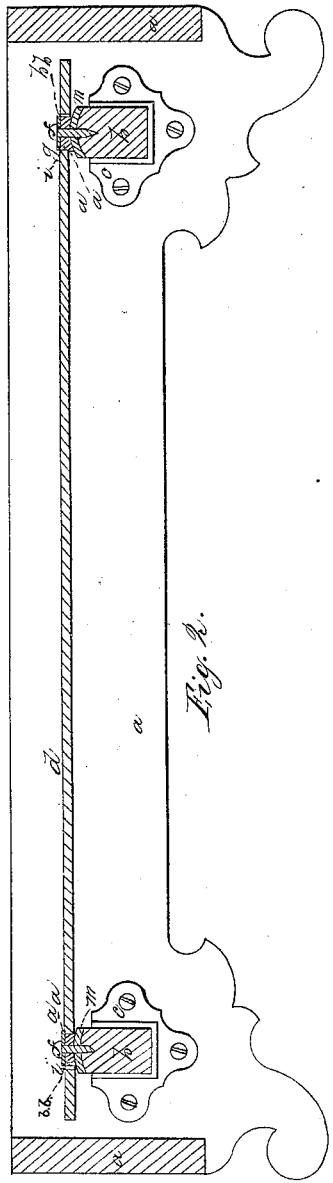

Figure 1 represents a plan of my improved bed-bottom. Fig. 2 represents a section through A and B.

*a* represents the frame; *b*, the cross-bars or supports; *c*, the cross-bar sockets; *d*, the slats; *e*, the circular holes in the slats *d*; *f*, the screws; *g*, the metallic washers; *i*, the rubber springs; *m*, the rubber washers.

The bed being furnished with the cross-bar sockets *c*, the cross-bars *b*, being rounded on top, are then prepared, so as to fit the sockets *c*. The cross-bars *b* are then spaced off or divided into as many parts or points as there are slats required. At every one of these points a hole is bored for the reception of the screws *f*, which have previously been prepared by placing the metallic washer *g* over the point and body of the screw *f*, and resting on its head. Then the rubber spring *i* is placed over and rests on the metallic washer *g*, after which the rubber washer *m* is placed over and rests on the rubber spring *i*. The screws *f* are then inserted into each hole bored in the cross-bars *b*, and with the proper instrument are screwed down until the metallic washer *g* rests on the rubber spring *i*. These several parts, being thus prepared, are ready for the reception of the slats *d*, which have been prepared with circular holes *e* at each end, the exact size of the metallic washers *g*, their distances from center to center corresponding exactly with the distance between the center of the screw *f* in one girt, *b*, across to its mate or corresponding screw in the other girt, with one-half of the diameter of the metallic washer *g* added, more or less. The slats *d* are then adjusted in their respective positions, each one separately, by passing the screw *f*, with metallic washer *g* and rubber spring *i*, through the circular hole *e*, resting on the rubber washer *m*. The other end is adjusted in position by shortening the slat *d* one-half the diameter of the metallic washer *g*, which is done by springing down the slat *d*.

Much difficulty and trouble have been experienced heretofore in all slatted spring bottoms, in consequence of the springs being arbitrary and stiff.

The slats being loose and liable oftentimes to come out of their respective places when the weight of one or more persons is applied, the friction produced by the spring of the slats causes disagreeable and unpleasant noise to the occupants.

In my improved bed-bottom all of these objections are entirely remedied. When the required weight, more or less, is brought to bear on the slats *d*, a corresponding spring or bending downward is produced, which shortens the slats *d*, and this action relieves the pressure of the spring *f* on the inside of the circular holes *e*, as seen at arrow *a a* in Fig. 2, and receives the full pressure and spring on the outside, as seen at arrow *b b* in Fig. 2. At the same time the slats *d* slide at each end under the metallic washers *g*, which entirely prevent them from coming off, and as the circular holes *e* in the slats *d* are entirely filled with the rubber springs *i*, and resting on the rubber washers *m*, the noise arising, as in other bottoms, is entirely remedied and silenced, which is very important. When the weight is removed the slats *d* recede back in their original position.

I do not claim the rubber washers *m*, nor the slats *d*.

What I do claim, and desire to secure by Letters Patent, is—

The combination of the rubber springs *i*, metallic washers *g*, and circular holes *e*, as herein described, and for the purpose set forth.

ROBERT L. HALL.

Witnesses:
JOHN M. PEVEY,
G. E. PEVEY.